United States Patent [19]

Taji et al.

[11] Patent Number: 4,634,494
[45] Date of Patent: Jan. 6, 1987

[54] ETCHING OF A PHOSPHOSILICATE GLASS FILM SELECTIVELY IMPLANTED WITH BORON

[75] Inventors: Satoru Taji, Toyonaka; Norio Yoshida, Nishinomiya; Tetsuo Hikawa, Takarazuka, all of Japan

[73] Assignee: Ricoh Company, Ltd., Tokyo, Japan

[21] Appl. No.: 760,135

[22] Filed: Jul. 29, 1985

[30] Foreign Application Priority Data

Jul. 31, 1984 [JP] Japan .................................. 59-161912

[51] Int. Cl.⁴ .................. B44C 1/22; C03C 15/00; C03C 25/06
[52] U.S. Cl. .................. 156/628; 156/644; 156/653; 156/657; 156/659.1; 156/663
[58] Field of Search ........... 156/628, 653, 657, 659.1, 156/663, 644; 29/576 B; 148/1.5, 186

[56] References Cited

U.S. PATENT DOCUMENTS

| 3,560,280 | 2/1971 | Nishida | 156/628 |
| 4,552,831 | 11/1985 | Liu | 156/628 |

FOREIGN PATENT DOCUMENTS

| 0148868 | 11/1981 | Japan | 156/628 |
| 0000131 | 1/1983 | Japan | 156/628 |
| 0035929 | 3/1983 | Japan | 156/628 |
| 0143533 | 8/1983 | Japan | 156/628 |

*Primary Examiner*—William A. Powell

[57] ABSTRACT

The etch rate of phosphosilicate glass becomes lowered as boron ions are implanted therein. In accordance with the principle of the present invention, boron ions are implanted into a phosphosilicate glass film selectively in location or concentration and the thus boron-implanted phosphosilicate glass film is etched by an etchant, for example buffered hydrofluoric acid solution, to etch an intended portion of the phosphosilcate glass film preferentially thereby defining a hole, such as a contact hole, or substantially flat surface.

14 Claims, 11 Drawing Figures

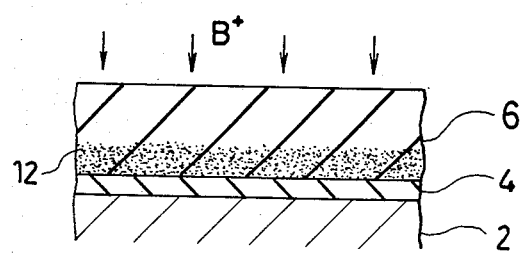
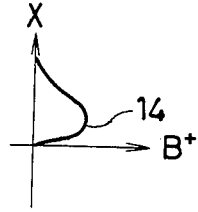
FIG.1a
FIG.2
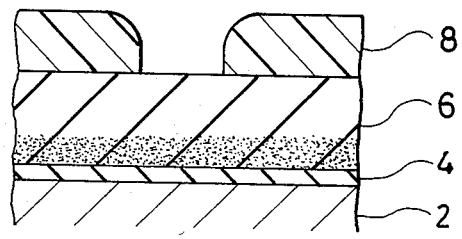
FIG.1b
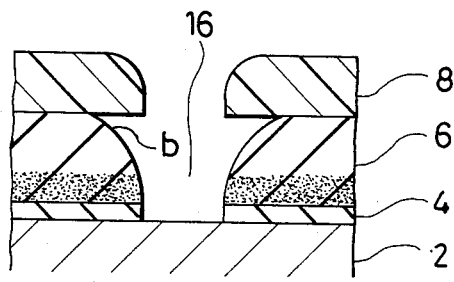
FIG.1c
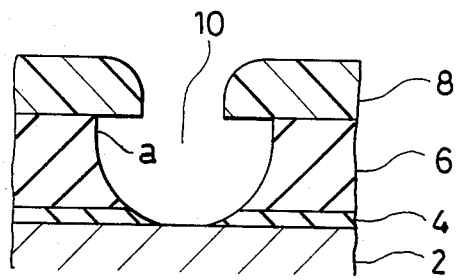
FIG.3
Prior Art

ETCHING OF A PHOSPHOSILICATE GLASS FILM SELECTIVELY IMPLANTED WITH BORON

BACKGROUND OF THE INVENTION

1. Field of the Invention

This invention generally relates to a process for manufacturing a semiconductor device, and, in particular, to a wafer process in the manufacture of a semiconductor device using a phosphosilicate glass as an interlayer insulating or passivation film. More specifically, the present invention relates to a technique of etching a phosphosilicate glass film selectively ion-implanted with boron.

2. Description of the Prior Art

A wafer process in the manufacture of a semiconductor device having a phosposilicate glass (also referred to as PSG, hereinafter) film includes a step for forming a contact hole, via or a bonding pad, and a step for smoothing the surface by removing sharp steps. It is known that the etch rate of a phosphosilicate glass film against hydrofluoric acid (HF) is high but a boron phosphosilicate glass (also referred to as BPSG, hereinafter) film, which has been formed by the CVD method with boron contained in phosphosilicate glass, has a lower etch rate against HF as compared with the ordinary PSG film. However, in such a BPSG film formed by the CVD method, boron atoms are contained in the resulting film uniformly.

Heretofore, no proposal has been made to utilize the fact of difference in etch rate depending on the amount of contents of boron atoms in a PSG film for processing the PSG film to form contact holes or the like.

SUMMARY OF THE INVENTION

It is therefore a primary object of the present invention to obviate the disadvantages of the prior art as described above and to provide an improved wafer process utilising implantation of boron atoms into a phosophosilicate glass.

Another object of the present invention is to provide an improved wafer process to form holes, such as contact holes and vias, in a phosphosilicate glass film by selective implantation of boron atoms into the film and etching.

A further object of the present invention is to provide an improved wafer process to flatten the surface of a phosphosilicate glass film using the step of selective implantation of boron atoms into the film and the step of etching the film.

A still further object of the present invention is to provide an improved process for manufacturing a semiconductor device.

Other objects, advantages and novel features of the present invention will become apparent from the following detailed description of the invention when considered in conjunction with the accompanying drawings.

BRIEF DESCRIPTION OF THE DRAWINGS

FIGS. 1a through 1c are cross-sectional views showing the representative steps in a wafer process in accordance with one embodiment of the present invention;

FIG. 2 is a graph showing the distribution of implanted boron atoms along the depth of a PSG film;

FIG. 3 is a cross-sectional view showing the shape of a contact hole formed according to the typical prior art method;

DESCRIPTION OF THE PREFERRED EMBODIMENTS

Figure 6:
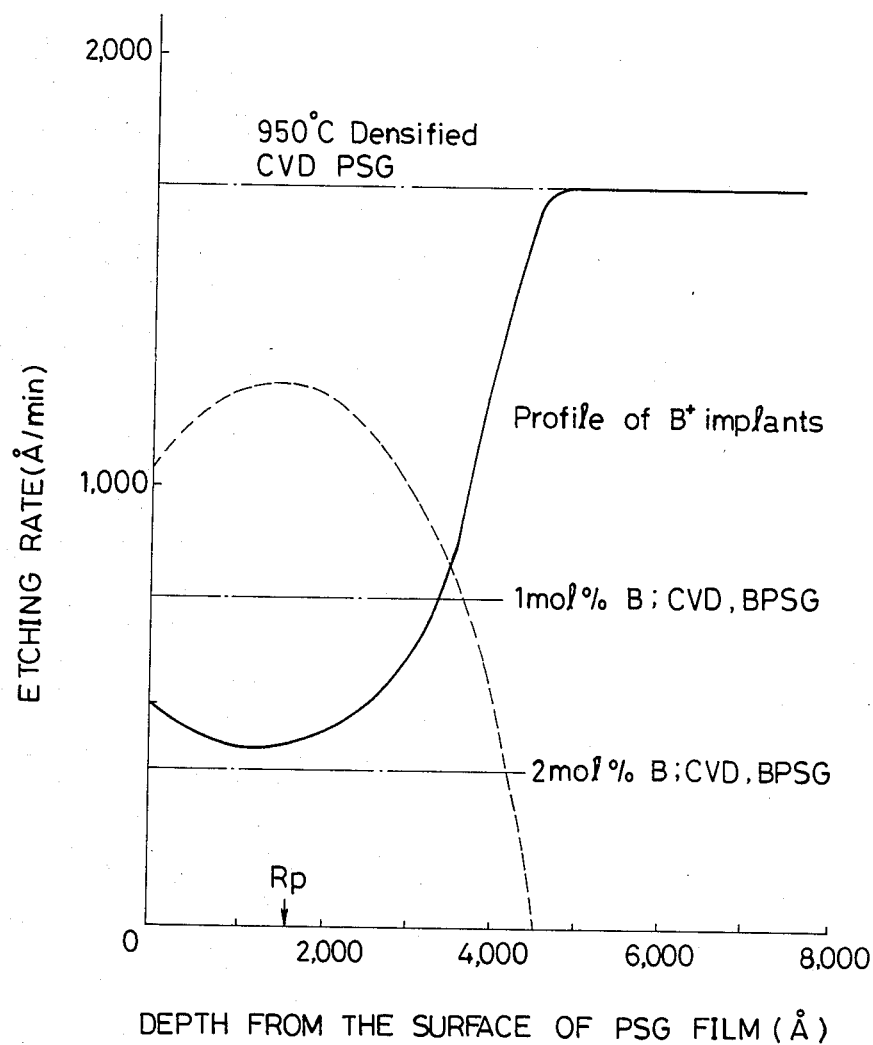
FIG. 6 is a graph showing how the etch rate varies depending on the amount of boron implants in a phosphosilicate glass.

In accordance with the principle of the present invention, boron ions are selectively implanted into a phosphosilicate glass film formed on a semiconductor structure, and the boron-implanted PSG film is then subjected to etching to form a desired pattern, such as a contact hole, utilizing the fact that the etching rate of a PSG film varies depending on the amount of boron implants. Described more in detail, as shown in FIG. 6, the etch rate of a phosphosilicate glass film varies depending on the amount of boron ions implanted therein, and, as shown there, the etch rate decreases as the amount of boron implants increases. Thus, if boron ions are implanted selectively into a phosphosilicate glass film, those portions of the film having higher concentrations of boron implants are etched at slower rates as compared with those portions having lower concentrations or no boron implants. Stated differently, the etch rate of a phosphosilicate glass film can be lowered by introduction of boron implants therein.

First, a description will be made with reference to FIG. 3 as to how a contact hole is formed in a phosphosilicate glass film when it is subjected to etching according to the prior art. When forming a hole, such as a contact hole, in a phosphosilicate glass film, according to a prior art technique, a resist pattern is formed on a phosphosilicate glass film which is then etched using the resist pattern as a mask. The resulting hole is shown in FIG. 3, and, as shown, it has a concave side surface. In the structure shown in FIG. 3, 2 indicates a silicon substrate or polysilicon layer, 4 a thermally grown oxide film, 6 a phosphosilicate glass, 8 a resist layer, 10 a hole, such as a contact hole. After formation of the hole 10, it is typically filled with an electrically conductive material to form a metal layer. But, since the top edge a of this hole 10 is very sharp so that there is a danger that the metal layer becomes disconnected at the edge a.

Now, referring to FIGS. 1a through 1c, it will be described as to a wafer process for forming a hole, such as a contact hole, in accordance with one embodiment of the present invention. It should be noted that like elements are indicated by like numerals throughout the present specification and the drawings.

As shown in FIG. 1a, there is provided a semiconductor structure including a silicon substrate 2 in which various active devices may be formed, for example, by diffusion of selected impurities. The element indicated by numeral 2 could be a polysilicon layer formed on such a silicon substrate. On the silicon substrate 2 is formed a thermally grown film 4 of silicon dioxide, and a phosphosilicate glass film 6 is formed as deposited on the silicon dioxide film 4. Preferably, the phosphosilicate glass film 6 is formed by a standard temperature CVD method and it has the phosphorous concentration of 8 mole %.

Then, boron ions (B+) are implanted into the phosphosilicate glass film 6 from the exposed surface of the film 6. It is to be noted that the boron ions 12 are implanted deeply thereby defining a distribution of implanted boron atoms as indicated by a profile 14 shown in FIG. 2. Thus, it can be generally said that the deeper the depth from the exposed surface of the film 6, the higher the concentration of implanted boron atoms 12. This indicates that the etch rate of phosphosilicate glass film 6 becomes lower as the depth from the exposed surface increases. In the preferred embodiment, this step of boron ion implantation is carried out at the energy level of 200 KeV or above with the dose of $1 \times 10^{17}$ ions/cm$^2$ or more.

After the ion implantation, the entire structure is heated to a temperature ranging from 900° C. to 1,000° C. in an atmosphere of H$_2$/O$_2$ thereby causing the phosphosilicate glass film 6 to reflow to minimize the existing steps in the exposed surface. Thereafter, as shown in FIG. 1b, a resist pattern 8 is formed on the phosphosilicate glass film 6. Then, using the resist pattern 8 as a mask, the phosphosilicate glass film 6 is etched, for example, by 15:1 buffered HF solution. It is to be noted that the etch rate against 15:1 buffered HF solution is 1,310 angstroms/min for phosphosilicate glass having no boron implants; whereas, the etch rate is 570 angstroms/min for phosphosilicate glass having boron ions implanted at the dose of $1 \times 10^{17}$ ions/cm$^2$. It is thus clear that the etch rate is reduced approximately to a half by having boron ions implanted into the PSG at dose of $1 \times 10^{17}$ ions/cm$^2$. As a comparison, the etch rate of a thermally grown silicon dioxide film under the same etching conditions is 400 angstroms/min.

As described previously with reference to FIGS. 1a and 2, since the phosphosilicate glass film 6 has the distribution of implanted boron ions as indicated in FIG. 2, the etch rate gradually becomes lower as the etching proceeds deeper, and, therefore, when the structure shown in FIG. 1b is subjected to etching, there is obtained a structure as shown in FIG. 1c. In this case, since the etch rate is higher near the exposed surface, the phosphosilicate glass film 6 is etched more closer to the exposed surface so that there is formed a hole 16 whose side surface is generally convex as contrasted to the generally concave side surface of the hole 10 formed according to the prior art as shown in FIG. 3. Thus, the resulting hole 16 has a top edge b which is less sharp so that the problem of possible disconnection of a metal layer formed thereon is completely eliminated.

Figure 4A:
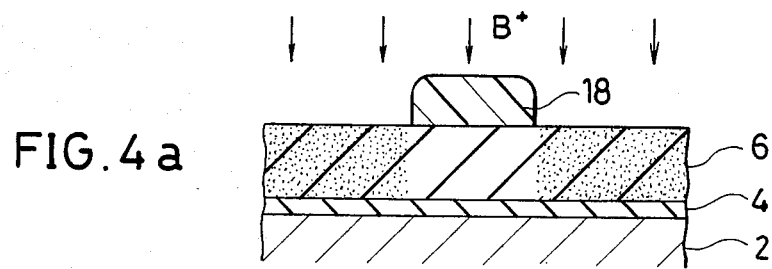
FIGS. 4a and 4b are cross-sectional views showing the representative steps in a wafer process in accordance with another embodiment of the present invention.
Figure 4B:
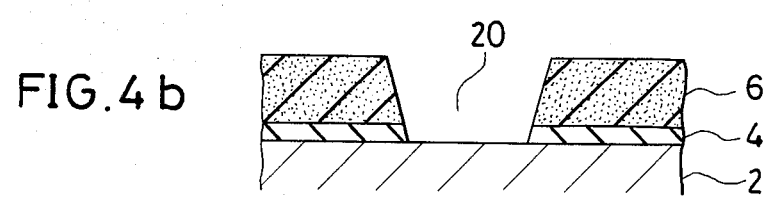

Referring now to FIGS. 4a and 4b, there is shown a wafer process for forming a hole, such as a contact hole, in accordance with another embodiment of the present invention. As shown in FIG. 4a, there is provided a semiconductor structure including the silicon substrate 2, thermally grown insulating film 4 of silicon dioxide and phosphosilicate glass film 6. And, a resist pattern 18 is formed on the phosphosilicate glass film 6 at a location where a contact hole is to be formed. Then, using this resist pattern 18 as a mask, ion implantation is carried out to have boron ions (B+) implanted into phosphosilicate glass film 6 except that portion which underlies the resist pattern 18. In the preferred embodiment, this ion implantation is carried out at the energy level in the order of 50 KeV at the dose of $1 \times 10^{17}$ ions/cm$^2$ or more.

As a result of this ion implantation, the phosphosilicate glass film 6 becomes implanted with boron ions except those portions masked by resist patterns, such as the one 18 shown in FIG. 4a. Thus, those portions of the phosphosilicate glass film 6 which are not covered and thus implanted with boron ions have a decreased etch rate as compared with those portions of phosphosilicate glass film 6 which are covered and thus not implanted with boron ions.

Then, the resist pattern 18 is removed and the entire structure is heated to a temperature ranging between 900° and 1,000° C. to have the surface of phosphosilicate glass film 6 smoothed by reflow. Then, the entire exposed surface of the phosphosilicate glass film 6 is subjected to etching, for example, with 15:1 buffered HF solution. As a result, there is obtained a hole 20 in the phosphosilicate glass film 6. As mentioned previously, that portion of the phosphosilicate glass film 6 which is covered by the resist pattern 18 is not implanted with boron ions and thus this portion has a higher etch rate as compared with that portion of the film 6 which is implanted with boron ions so that the portion underlying the resist pattern 18 is etched away completely while the rest is etched very little thereby forming the hole 20. In this instance, if it is so controlled that the implanted boron ions define a distribution profile as shown in FIG. 2, the film 6 is etched more as closer to the exposed surface so that the top edge of the hole 20 may be defined to be less sharp.

In manufacturing a semiconductor device having a dual-layer polysilicon structure or dual-layer metal structure, steps in the surface present problems. Such steps have been removed customarily by heating the entire structure to an elevated temperature, e.g., 900°–1,000° C., to cause a PSG film to reflow thereby smoothing the surface. However, such a conventional approach to reflow a PSG film to eliminate steps in the surface is not satisfactory.

Figure 5A:
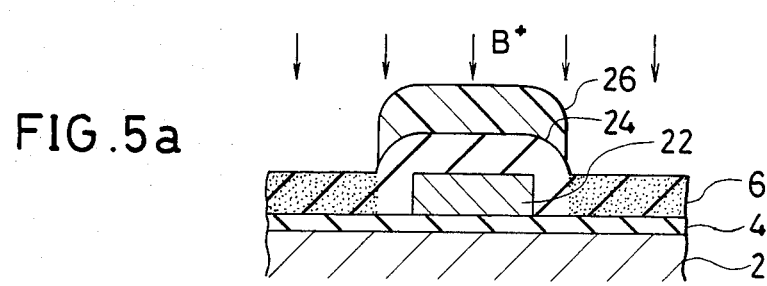
FIGS. 5a through 5c are cross-sectional views showing the representative steps in a wafer process for flattening the surface in accordance with a further embodiment of the present invention.
Figure 5B:
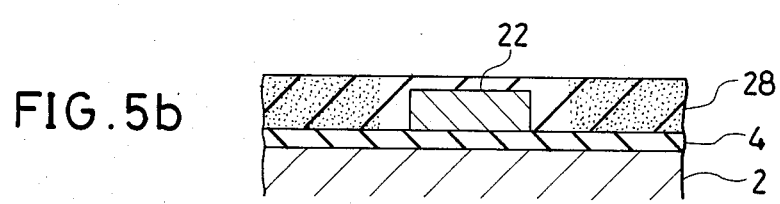
Figure 5C:
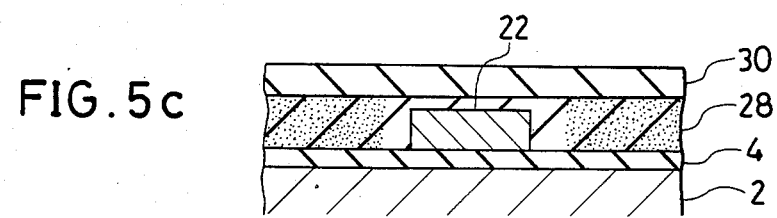

Referring now to FIGS. 5a through 5c, there is provided a wafer process for smoothing the exposed surface of a phosphosilicate glass embodying the present invention. As shown in FIG. 5a, there is provided a semiconductor structure including the silicon substrate 2 and the thermally grown insulating film 4 of silicon dioxide. A polysilicon layer is formed on the insulating film 4 and then it is patterned to define a polysilicon line 22. If desired, using this polysilicon line 22, source and drain regions may be formed in the silicon substrate 2 in a self-aligned fashion. Then, across the surface of the insulating film 4 and the polysilicon line 22, there is formed the phosphosilicate glass film 6, for example, having the phosphosilicate concentration of 8 mole % as deposited thereon, for example, according to the standard temperature CVD method. Since the film 6 overlies the polysilicon line 22, there is formed a projection 24 there. Then, a resist pattern 26 is formed on the projection 24 of the phosphosilicate glass film 6, and, then, using this resist pattern 26 as a mask, boron ions (B+) are implanted into the photsphosilicate glass film 6 so that boron ions are implanted into that portion of the phosphosilicate glass film 6 which is not covered by the resist pattern 26.

It is to be noted that the projection 24 of phosphosilicate glass film 6 is larger in size than the polysilicon line 22 approximately by 1 micron. Thus, the resist pattern 26 serving as a mask should be formed such that it is larger in size than the underlying polysilicon line 22 approximately by 1 micron.

Thereafter, the resist pattern 26 is removed by any conventional method, and, then, the entire structure is heated to an elevated temperature ranging from 900° C. to 1,000° C. thereby causing the phosphosilicate glass film 6 to reflow so that the exposed surface of the phosphosilicate glass film 6 becomes smoothed to some extent. Thereafter, the entire exposed surface of the phosphosilicate glass film 6 is subjected to etching, for example, by using 15:1 buffered HF solution for about 5 minutes. Since the projection 24 of phosphosilicate glass film 6 has not been implanted with boron ions, this portion can be etched at a higher rate as compared with the rest so that, as a result of this blanket etching step, the projection 24 can be etched away while keeping the rest etched very little. Accordingly, there is obtained a substantially flat surface as shown in FIG. 5b as a result of this etching step. It should be noted that the ion implanting conditions may be set easily by one skilled in the art so as to obtain a substantially flat surface as indicated in FIG. 5b as a result of this blanket etching step.

On the surface of the flattened phosphosilicate glass film 28, a film 30 of silicon dioxide is formed, for example, by the CVD method. Then, a commonly used method can be applied to define a contact hole or metalization to complete a semiconductor device having no steps and disconnections in interconnections.

It is to be noted that the structure shown in FIGS. 5a through 5c has a single polysilicon layer, but the present invention can also be applied to a semiconductor structure having a multi-layer polysilicon or metal interconnection. Since steps are more appreciable in a multi-layer interconnection, the present invention is, in fact, more advantageous when applied to such a multi-layer interconnection.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A process for forming a hole in a phosphosilicate glass film formed on an underlying structure, comprising the steps of:
   introducing ions of selected material into said phosphosilicate glass film so as to define a desired concentration profile of said ions in said film, said ions of selected material causing to lower an etch rate of said phosphosilicate glass film when introduced therein;
   forming a mask having a desired pattern on said phosphosilicate glass film; and
   etching said phosphosilicate glass film to define a hole therein using the pattern of said mask.

2. The process of claim 1 wherein said selected material includes boron.

3. The process of claim 2 wherein said concentration profile is such that the concentration of introduced boron ions generally increases as it goes deeper from the exposed surface of said phosphosilicate glass film.

4. The process of claim 3 wherein said step of introducing is carried out by ion implantation.

5. The process of claim 4 wherein said ion implantation step is carried out at the energy level of 200 KeV or more at the dose of $1 \times 10^{17}$ ions/cm$^2$ or more.

6. The process of claim 5 wherein said step of etching is carried out using 15:1 buffered hydrofluoric acid solution.

7. A process for forming a hole in a phosphosilicate glass film formed on an underlying structure, comprising the steps of:
   forming a resist pattern on the surface of said phosphosilicate glass film at a location where said hole is to be formed in said phosphosilicate glass film;
   introducing ions of selected material into said phosphosilicate glass using said resist pattern as a mask, said ions of selected material causing to lower an etch rate of said phosphosilicate glass film when introduced therein;
   removing said resist pattern; and
   subjecting the entire exposed surface of said phosphosilicate glass film to a selected etchant thereby causing that portion of said phosphosilicate glass which was covered by said resist pattern during the step of introducing to have that portion etched away at a faster etch rate than the rest.

8. The process of claim 7 wherein said step of introducing includes an ion implantation step for implanting boron ions into said phosphosilicate glass film where not covered by said resist pattern.

9. The process of claim 8 wherein said ion implantation step is carried out at the energy level in the order of 50 KeV with the dose of $1 \times 10^{17}$ ions/cm$^2$ or more.

10. The process of claim 9 wherein said selected etchant is 15:1 buffered hydrofluoric acid solution.

11. A process for flattening an exposed surface of a phosphosilicate glass film formed on an underlying structure having a raised portion at its top surface, said phosphosilicate glass film defining a projection corresponding to said raised portion, comprising the steps of:
   forming a resist pattern as covering at least said projection of said phosphosilicate glass film;
   introducing ions of selected material into said phosphosilicate glass film using said resist pattern as a mask, said ions of selected material causing to lower an etch rate of said phosphosilicate glass film when introduced therein;
   removing said resist pattern; and
   subjecting the entire exposed surface of said phosphosilicate glass film to a selected etchant thereby causing said projection of phosphosilicate glass film to be etched away partly at an etch rate higher than the rest to thereby define a substantially flat surface.

12. The process of claim 11 wherein said resist pattern extends laterally over a predetermined distance beyond the edge of said raised portion.

13. The process of claim 12 wherein said predetermined distance is approximately 1 micron.

14. The process of claim 12 wherein said step of introducing includes a step of ion implantation using boron as said selected material.

* * * * *